United States Patent [19]

Walters

[11] 4,383,681
[45] May 17, 1983

[54] AUTOMOBILE DOLLY

[76] Inventor: Charles J. Walters, 65850 Hartway, Romeo, Mich. 48065

[21] Appl. No.: 222,581

[22] Filed: Jan. 5, 1981

[51] Int. Cl.³ .................................................. B66F 5/04
[52] U.S. Cl. ........................................ 269/17; 269/69; 269/296
[58] Field of Search ...................... 414/426, 427, 429; 280/638, 659, 79.1 R, 79.1 A; 269/17, 296, 69; 254/2 R, 2 B, 133, 133 A, 134

[56] References Cited

U.S. PATENT DOCUMENTS

| 949,331 | 2/1910 | Scholle | 254/2 B |
|---|---|---|---|
| 1,016,381 | 2/1912 | Watson | 280/659 |
| 2,505,583 | 4/1950 | Sage et al. | 280/79.1 |
| 3,302,927 | 2/1967 | Gray | 254/2 B |
| 3,740,020 | 6/1973 | Arnes | 254/2 B |
| 3,830,470 | 8/1974 | Gibson | 254/133 |
| 3,850,419 | 11/1974 | Craig | 254/2 B |
| 3,937,443 | 2/1976 | Durgan | 254/134 |
| 3,949,976 | 4/1976 | Cofer | 269/17 |
| 4,123,038 | 10/1978 | Meyers | 414/427 |
| 4,269,394 | 5/1981 | Gray | 254/134 |

FOREIGN PATENT DOCUMENTS

| 902185 | 1/1954 | Fed. Rep. of Germany | 254/134 |
|---|---|---|---|
| 415835 | 11/1946 | Italy | 280/659 |

Primary Examiner—Robert C. Watson
Attorney, Agent, or Firm—Basile, Weintraub & Hanlon

[57] ABSTRACT

An automobile dolly for supporting the front end of a front wheel drive vehicle during transmission repair. The dolly of the present invention comprises a wheel supported frame sufficiently narrow to pass between the tracks of a vehicle hoist. A rear tubular transverse support is attached to the frame and inward from and spaced above the tracks, with a pair of opposed transversely adjustable rear sleeves telescopically engaging the rear tubular transverse support and adjustably projecting over the tracks. A vertically adjustable support member is attached to each opposed rear sleeve and configured to abut and support the vehicle. A front tubular transverse support is spaced from the rear tubular transverse support and attached to the frame and is spaced inward from and above the tracks. A pair of opposed transversely adjustable front sleeves telescopingly engage the front tubular transverse support to adjustably project over the tracks. A vertically adjustable support member is attached to each opposed front sleeve and configured to abut and support the vehicle so that support of the vehicle's front end may be transferred from the hoist to the dolly and the vehicle moved using the dolly wheels during transmission repair.

7 Claims, 5 Drawing Figures

AUTOMOBILE DOLLY

BACKGROUND OF THE INVENTION

1. Field of the Invention

The present invention generally relates to the field of dollys for facilitating vehicle repair. And, in particular, the present invention is concerned with an automobile dolly for supporting the front end of a front wheel drive vehicle during transmission repair.

2. Description of the Prior Art

Hoists, workholders, and dollys for transporting pianos, power plants, engines, and the like are known. Examples of devices of this type in the prior art are disclosed in U.S. Pat. Nos. 1,114,829; 2,790,232; 2,904,308; 3,085,798; 3,727,903; 3,949,976; and 4,177,978. These patents are relevant to the applicant's invention in that they represent the closest prior art for utilizing hoists or dollys to support and move articles.

SUMMARY OF THE INVENTION

The present invention, which will be described in greater detail hereinafter, comprises a dolly for use in repairing the transmissions of front wheel drive vehicles in which the engine and transmission mounted in the front. When the transmission of a vehicle of this type is under repair the front wheel axle assembly has to be disconnected from the car or substantially disengaged so that the front wheels of the automobile are not of any value in that they will not support the car and the car may not be moved. Therefore, under normal circumstances, if the transmission is removed, the car must remain on the hoist until the transmission is repaired and replaced in the car. This seriously limits the amount of repair work a transmission shop may undertake without the installation of additional hoists. The present invention comprises an automobile dolly for supporting the front end of a front drive vehicle during transmission repair including a wheel supported frame sufficiently narrow to pass between the tracks of a vehicle hoist, and a rear tubular transverse support attached to the frame and spaced inward from and above the tracks. A pair of opposed transversely adjustable rear sleeves telescopingly engage the rear tubular transverse support adjustably projecting over the tracks. A vertically adjustable support member is attached to each opposed rear sleeve and is configured to abut and support the vehicle frame. A tubular transverse support is spaced from the rear tubular transverse support and attached to the frame and spaced inward and above the tracks.

A pair of opposed transversely adjustable front sleeves telescopingly engage the front tubular transverse support and adjustably project over the tracks. A vertically adjustable support member is attached to each opposed front sleeve and is configured to abut and support the vehicle frame. Utilizing the vertically adjustable support members to abut the vehicle frame, support of the vehicle front end may be transferred from the hoist to the dolly and the vehicle may be removed from the hoist and moved about the shop utilizing the dolly wheels.

It is therefore a primary object of the present invention to provide a new and improved dolly for repair of front wheel drive vehicle transmissions.

It is a further object of the present invention to provide such a dolly that will allow the front end of a front wheel drive vehicle to be supported in such a manner that the vehicle can be freely moved after the transmission has been removed.

It is a further object of the present invention to provide a dolly to support the front end of a front wheel drive vehicle under going transmission repair and allow the vehicle to be removed from the repair hoist to free up the hoist for other repair work.

Further objects, advantages, and applications of the present invention will become apparent to those skilled in the art of front wheel drive vehicle transmission repair when the accompanying description of one example of the best mode contemplated for practicing the invention is read in conjunction with the accompanying drawing.

BRIEF DESCRIPTION OF THE DRAWING

In the drawing like numbers refer to like parts throughout the several views and wherein.

DESCRIPTION OF THE PREFERRED EMBODIMENT

Figure 1:
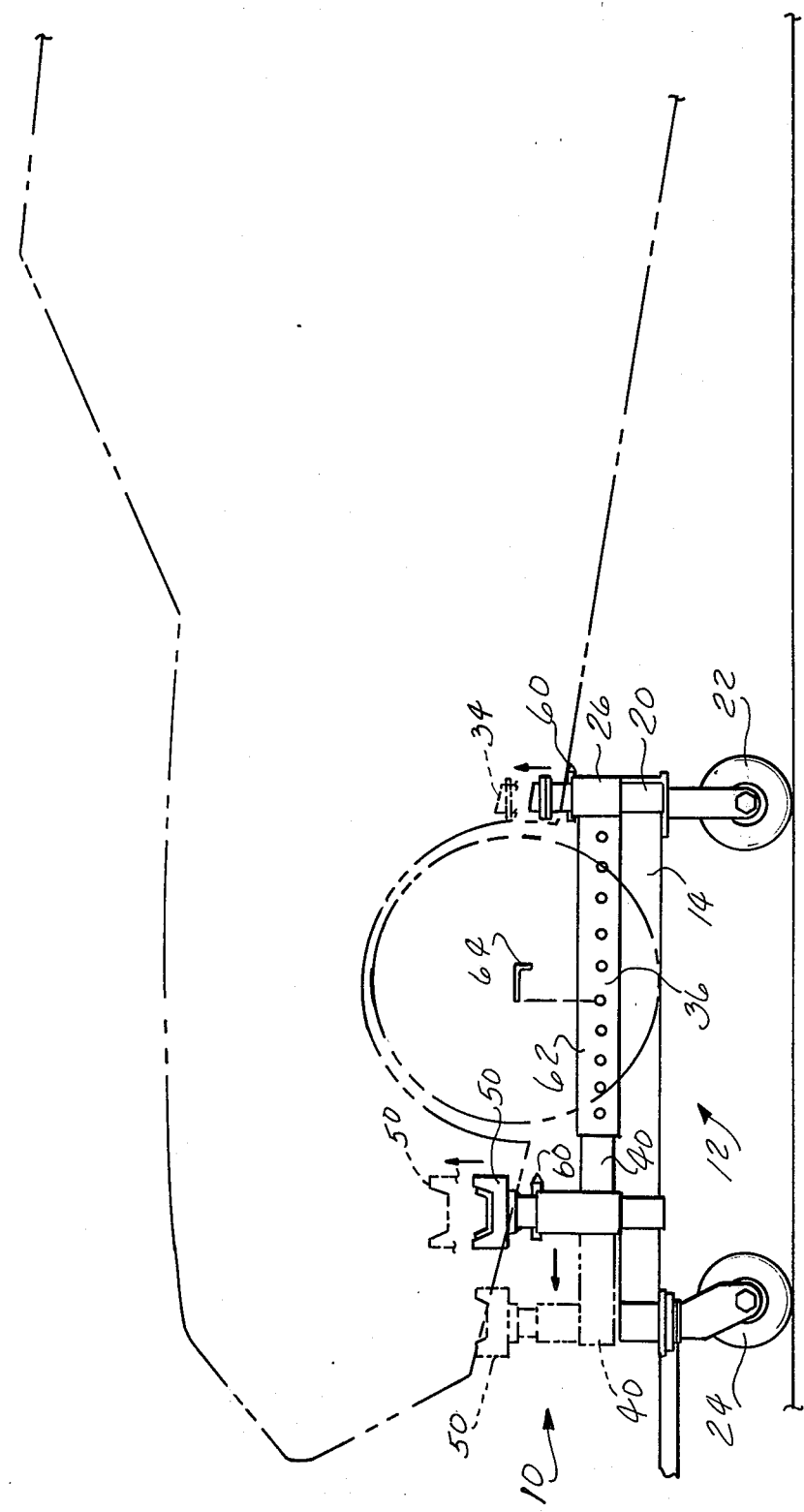
FIG. 1 illustrates a side view of the dolly of the present invention.
Figure 2:
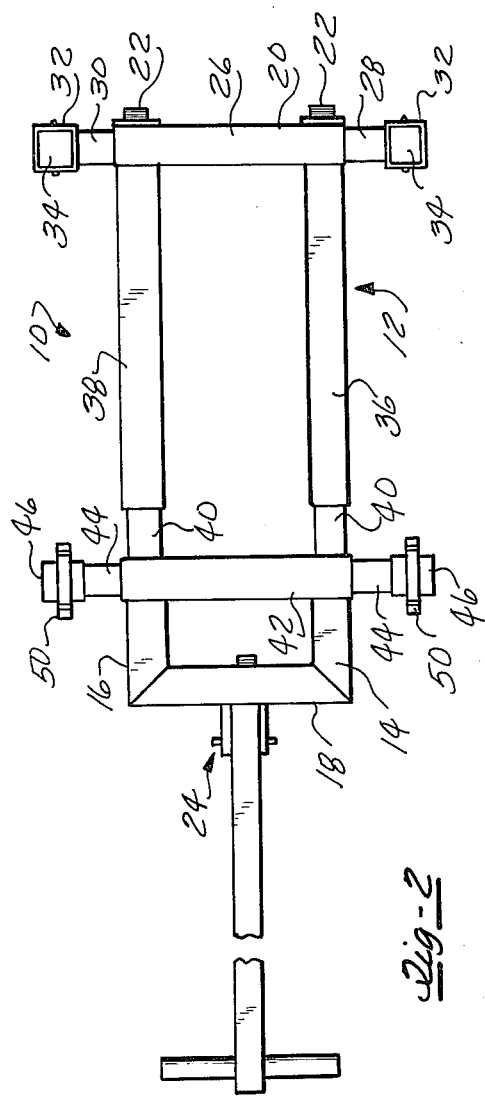
FIG. 2 is a top view of the dolly of FIG. 1.
Figure 3:
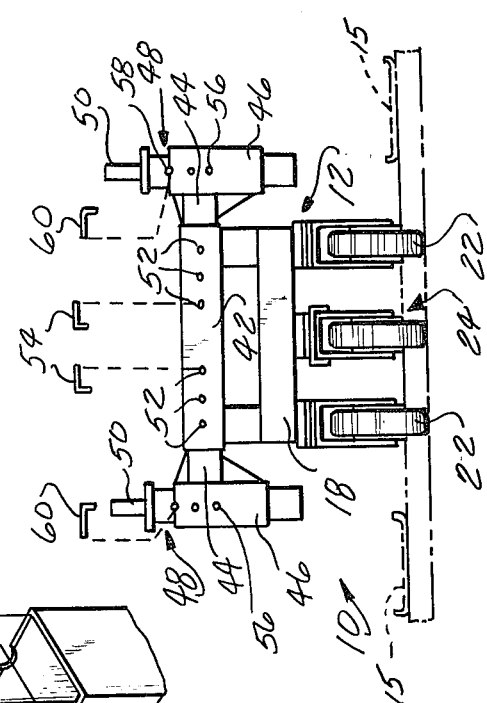
FIG. 3 is a front view of the dolly of FIG. 1.

Referring now to the drawing and in particular FIGS. 1, 2, and 3, there is illustrated at 10 an automobile dolly adapted to support the front end of a front wheel drive vehicle undergoing transmission repair. The automobile dolly 10 comprises a base frame 12 including a pair of spaced apart longitudinal side members 14, 16 a front transverse or cross member 18 and a rear transverse or cross member 20 extending between longitudinal members side 14, 16. The longitudinal members side and the front and rear transverse cross members are cojoined to form a frame with an open center. A pair of longitudinally aligned spaced apart wheels 22 are affixed to the ends of the rear transverse cross member 20, and a pivotable castor wheel 24 is centrally attached to the front transverse cross member 18 allowing the dolly to be rolled along the floor. The wheels 22, 24 are configured to pass between the tracks 15 of a hoist for supporting the wheels of the vehicle. A rear tubular transverse support 26 rests upon and is affixed to the spaced longitudinal side members 14, 16, and a pair of opposed transversely adjustable rear sleeves 28, 30 are telescopingly engageable with the rear transverse tubular support 26, with a rear vertical tube 32 being attached to an outer end of each rear sleeve 28, 30. A rear support 34 is telescopingly engaged with each rear vertical tube 32 and is configured to adjustably overlay the tracks 15.

A pair of longitudinal tubes 36, 38 are provided with the tubes 36, 38 respectively overlaying each side member 14, 16 and in parallel abutment therewith. The longitudinal tubes 36, 38 extend from the transverse support 26 to a point short of the front transverse member cross 18. A pair of longitudinal sleeves 40 telescopingly engage the longitudinal tubes 36, 38 and a front transverse tube 42 extends across the longitudinal sleeves 40 to join them into a U-shaped piece telescopingly engageable with the longitudinal tubes 36, 38. A pair of opposed transversely adjustable front sleeves 44 telescopingly engage the ends of the front transverse tube 42, and a front vertical tube 46 is attached to an outer end of each front transverse sleeve 44. A front support 48 telescopingly engages each front vertical tube 46, and a front support member 50 is releasably attached to an upper end of each front support 48.

Means are provided for selectively adjusting the spacing between the front and rear support members. The means comprises a plurality of transversely spaced apertures 52 formed in an outer end of the front tubular transverse support 42 and the rear tubular transverse support 26. An aperture (not shown) is formed in each front and rear transverse sleeve 44, and 28, 30, and is configured to selectively align with one of the corresponding plurality of transversely spaced apertures 52, and a first pin 54 is engageable with the aligned apertures to secure the front and rear transverse sleeves in place.

Means for selectively adjusting the height of the front and rear support members 48, 34 is provided and comprises a plurality of vertically spaced apertures 56 formed in each front vertical sleeve 44 and each rear vertical sleeve 28, 30. A half round recess 58 is formed along an upper edge of each front vertical tube 46 and each rear vertical tube 32 and is configured to selectively align with the plurality of vertically spaced apertures 56, and a second pin 60 is provided for each sleeve to slidingly engage the corresponding vertically spaced aperture and rest upon the recess 58 to secure the front and rear vertical sleeves in position.

Means are provided for selectively adjusting the spacing between the front support members and the rear support members and comprises a plurality of longitudinally spaced apertures 62 formed in each of the longitudinal tubes 36, 38, and an aperture (not shown) formed in each of the longitudinal sleeves 40 and configured to selectively align with a corresponding aperture among the plurality of apertures 62 and a third pin 64 is provided to slidingly engage the aligned apertures to secure the corresponding longitudinal sleeve to its telescopingly mated longitudinal tube.

Figure 4:
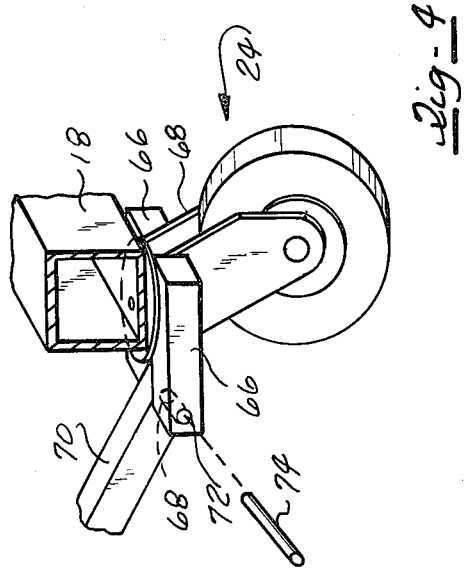
FIG. 4 illustrates a broken perspective view of the pivotable castor wheel.

Referring now to FIG. 4 of the drawing, a pair of spaced apart forward extending rails 66 are attached to the castor 68 of the pivotable castor wheel 24. A towing tongue 70 is inserted between rails 66 and an aperture 68 formed in the towing tongue 70 is aligned with a pair of apertures 72 in the rails 66. A pin 74 engages the aligned apertures to hingedly join the towing tongue 70 to the caster 68 and allow the pivoting caster wheel to be steerable and towable by means of the towing tongue.

Figure 5:
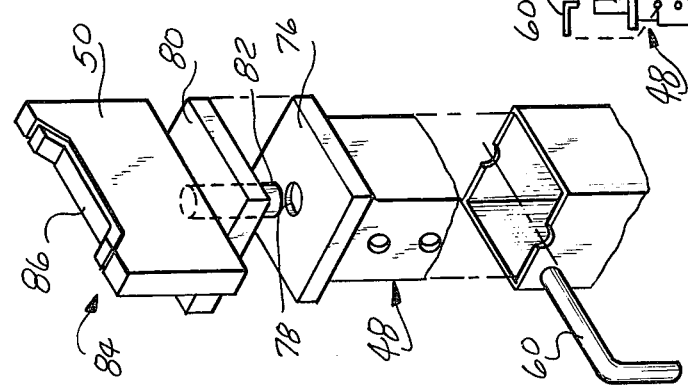
FIG. 5 illustrates a broken perspective view of the front support.

Referring now to FIG. 5 of the drawing, a cap 76 covers an upper end of each front and rear support 48, 34 and has an opening 78 formed centrally therein. The cap 76 projects horizontally over the support to which it is attached to prevent the support from entering its mating tube too far and dropping through the tube. A flange 80 is provided complementary to the cap and is carried by each front and rear support member. A dowel 82 projecting from the flange 80 engages the opening 78 to secure the flange 80 in position when in use but provides an easy means for removing the flange 80 and substituting a different support member 50 having a contour more suited to the shape of the vehicle to be supported. In a preferred embodiment a complementary projection 84 is attached to the flange 80 to abut the body or frame of the vehicle to be supported, and a fabric pad 86 is attached to the complementary projection 84 to aid in securing the projection 84 in abutment with the vehicle without scratching or otherwise marring the vehicle. It can be readily appreciated by the skilled artesian that a large variety of complementary projections 84 can be provided for the various vehicles to be mounted on the dolly of the present invention.

It can thus be seen that the present invention has provided a new and improved automobile dolly for transmission repairs for front wheel drive vehicles wherein a vehicle with its transmission removed can be readily transported from place to place within the repair shop.

It should be understood by those skilled in the art of front wheel drive transmission repair that other forms of the applicant's invention may be had, all coming within the spirit of the invention and the scope of appended claims.

Having thus described my invention what I claim is:

1. An automobile dolly for supporting the front end of a front wheel drive vehicle during transmission repair comprising:
   a base frame including a pair of spaced side members, a front cross member and a rear cross member extending between and joined to said side members to form a frame with an open center;
   wheel means attached to said base frame;
   a rear tubular transverse support resting upon and affixed to said spaced side members;
   a pair of opposed transversely adjustable rear sleeves telescopically engageably with said rear transverse tubular support;
   a rear vertical tube attached to an outer end of each rear sleeve;
   a rear support telescopingly engaged with each rear vertical tube;
   a pair of longitudinal tubes, each tube overlaying a side member and disposed in parallel abutment therewith, said longitudinal tubes extending from said rear transverse support to a point short of said front cross member;
   a pair of longitudinal sleeves telescopingly engageable with said longitudinal tubes;
   a front transverse tube extending between said longitudinal sleeves to joint them into a U-shaped piece telescopingly engageable with said longitudinal tubes;
   a pair of opposed transversely adjustable front sleeves telescopingly engageable with the ends of said front transverse tube;
   a front vertical tube attached to an outer end of each front sleeve;
   a front support telescopingly engaged with each front vertical tube;

means for selectively adjusting the transverse spacing of said front and rear support members;
   means for selectively adjusting the height of said front and rear support members; and
   means for selectively adjusting the longitudinal spacing between said front and rear support members.

2. The automobile dolly as defined in claim 1 wherein the wheel means comprises:
   a pair of longitudinally aligned, spaced wheels attached to the ends of the rear cross member; and
   a pivotable castor wheel centrally attached to the front cross member.

3. The automobile dolly as defined in claim 2 further comprising:
   a pair of spaced apart forward extending rails attached to the castor of the pivotable castor wheel;

a towing tongue inserted between said rails, an aperture formed in the towing tongue aligned with a pair of apertures in said rails and a pin engaging the aligned apertures to hingedly join the towing tongue to the castor; and whereby the pivotable castor wheel is made steerable and towable.

4. The automobile dolly as defined in claim 1 wherein the means for selectively adjusting the transverse spacing of said front and rear support members comprises;
 a plurality of transversely spaced apertures formed in an outer end of the front tubular transverse support and the rear tubular transverse support.
 an aperture formed in each front and rear transverse sleeve configured to selectively align with one of the corresponding plurality of transversely spaced apertures; and
 a first pin engageable with each of the aligned apertures to secure the front and rear transverse sleeves in place within the front and rear tubular transverse supports.

5. The automobile dolly as defined in claim 1 wherein the means for selectively adjusting the height of said front and rear support members comprises:
 a plurality of vertically spaced apertures formed in each front vertical sleeve and each rear vertical sleeve;
 a half round recess formed along an upper edge of each front vertical tube and rear vertical tube configured to selectively align with one of the plurality of vertically spaced apertures; and
 a second pin for each sleeve slidingly engaging the corresponding vertically spaced apertures and resting upon the recess to secure the front and rear vertical sleeves in position in the front and rear vertical tubes.

6. The automobile dolly as defined in claim 1 wherein the means for selectively adjusting the longitudinal spacing between the front support members and the rear support members comprises:
 a plurality of longitudinally spaced apertures formed in each of the longitudinal tubes;
 an aperture formed in each of the longitudinal sleeves configured to selectively align with one of the corresponding plurality of longitudinally spaced apertures; and
 a pin slidingly engaging the aligned apertures to secure the corresponding longitudinal sleeve to the longitudinal tube.

7. The automobile dolly as defined in claim 1 further comprising:
 a cap covering an upper end of each front and rear support;
 an opening formed in said cap;
 a flange complementary to the cap carried by each front and rear support member; and
 a dowel projecting from the flange slidingly engaging the opening in the cap whereby the front and rear support members are easily interchanged.

* * * * *

UNITED STATES PATENT AND TRADEMARK OFFICE
CERTIFICATE OF CORRECTION

PATENT NO. : 4,383,681
DATED : May 17, 1983
INVENTOR(S) : Charles J. Walters

It is certified that error appears in the above-identified patent and that said Letters Patent are hereby corrected as shown below:

In Column 1, line 26, following "transmission" insert -- are--

In Column 2, line 38, preceding "members" please insert -- side -- (two occurrences); and following "members" please delete "side" (two occurrences)

In Column 2, line 61, preceding "members" please insert -- cross--; and on line 62, please delete "cross"

Signed and Sealed this

Sixth Day of September 1983

[SEAL]

Attest:

GERALD J. MOSSINGHOFF

Attesting Officer — Commissioner of Patents and Trademarks